United States Patent
Jacob et al.

(10) Patent No.: US 7,526,113 B2
(45) Date of Patent: Apr. 28, 2009

(54) METHOD FOR PROCESSING AN IMAGE SEQUENCE OF A DISTORTABLE 3-D OBJECT TO YIELD INDICATIONS OF THE OBJECT WALL DEFORMATIONS

(75) Inventors: Marie Jacob, Paris (FR); Olivier Gerard, Viroflay (FR); Antoine Collet-Billon, Paris (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 763 days.

(21) Appl. No.: 10/478,075

(22) PCT Filed: May 21, 2002

(86) PCT No.: PCT/IB02/01826

§ 371 (c)(1), (2), (4) Date: Nov. 18, 2003

(87) PCT Pub. No.: WO02/095683

PCT Pub. Date: Nov. 28, 2002

(65) Prior Publication Data

US 2004/0125997 A1    Jul. 1, 2004

(30) Foreign Application Priority Data

May 22, 2001    (EP)    .................................. 01401348

(51) Int. Cl.
*G06K 9/00*    (2006.01)
(52) U.S. Cl. ............................. 382/128; 128/922; 378/4
(58) Field of Classification Search ......... 382/128–132, 382/100; 128/922; 378/4, 21–27
See application file for complete search history.

(56) References Cited

U.S. PATENT DOCUMENTS

| | | | |
|---|---|---|---|
| 5,431,161 A * | 7/1995 | Ryals et al. ................. | 600/425 |
| 5,687,737 A * | 11/1997 | Branham et al. ............ | 600/523 |
| 5,722,405 A * | 3/1998 | Goldberg ..................... | 600/407 |
| 5,803,914 A * | 9/1998 | Ryals et al. ................. | 600/407 |
| 7,155,042 B1 * | 12/2006 | Cowan et al. ............... | 382/128 |
| 2002/0072670 A1 * | 6/2002 | Chenal et al. ............... | 600/449 |
| 2005/0111717 A1 * | 5/2005 | Yoshioka et al. ............ | 382/128 |

OTHER PUBLICATIONS

"Simplex Meshes: a General Representation for 3D shape Reconstruction" published in the "Proceedings of the International Conference on Computer Vision and Pattern Recognition (CVPR'94), Jun. 20-24, 1994, Seattle, USA".

(Continued)

*Primary Examiner*—Anand Bhatnagar

(57) ABSTRACT

An image processing method for processing a sequence of images of a distortable 3-D Object, each image being registered at a corresponding image instant within the interval of time of the sequence having steps to construct and display an image of said 3-D Object represented with regions, each region showing a quantified indication relating to its maximal contraction or relaxation within said interval of time. Each region of the constructed and displayed image is attributed a respective color of a color coded scale that is function of the calculated quantified indication relating to the maximum of contraction or relaxation of said region. The quantified indications may be the instant when a face or region has had its maximum of contraction or relaxation; or the phase value corresponding to said maximum; or the delay to attain said maximum.

19 Claims, 3 Drawing Sheets

OTHER PUBLICATIONS

Wei-Te Lin et al: "Visualization of cardiac dynamics using physics-based deformable model" Medical Imaging 2000: Image Display and Visualization, San Diego, CA, USA, Feb. 13-15, 2000, vol. 3976, pp. 210-217, XP008019251, Proceedings of the SPIE—The Int'l Soc. for Optical Eng., 2000, SPIE-Int. Soc. Opt. Eng, USA.

Papademetris X et al: "3D cardiac deformation from ultrasound images" Medical Image computing and computer-assisted intervention—MICCAI '99. Second int'l conf. Preceedings (Lecture notes in computer science vol. 1679), Medical image computing and computer-assisted intervention—MICCAI '99, Cambridge, UK, pp. 420-429, XP008019304.

Van den Maegdenbergh V et al.: "Visualizaiton ofhte gastric mechanical systole using a new scintigraphic technique" Journal of Nuclear Medicine Technology, Dec. 1990, USA, vol. 18, No. 4, pp. 248-251. XP008019294.

* cited by examiner

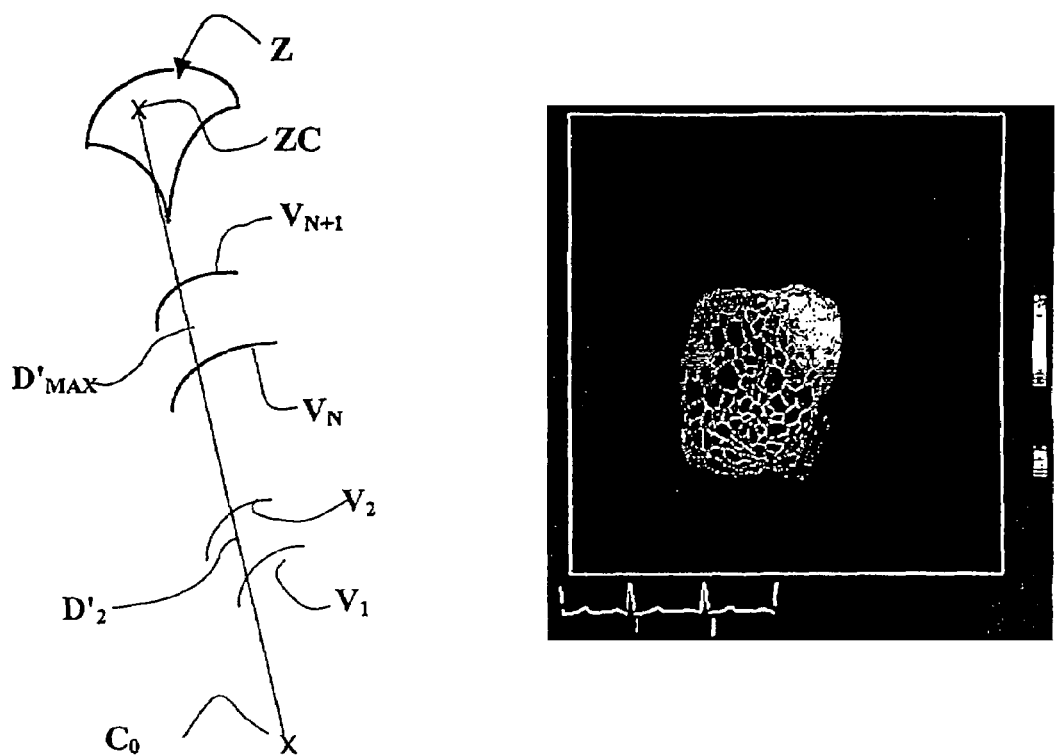
FIG.2
FIG.4
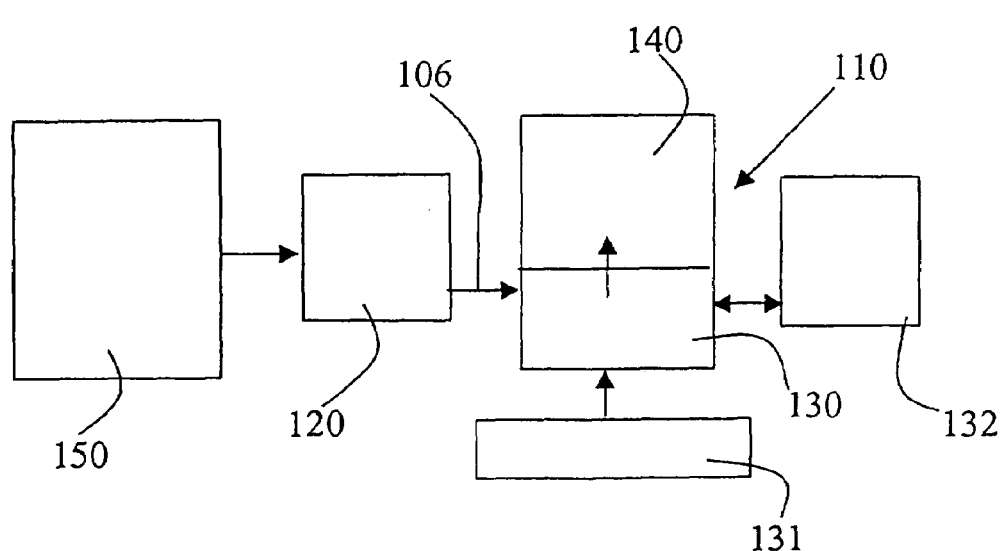
FIG.5

METHOD FOR PROCESSING AN IMAGE SEQUENCE OF A DISTORTABLE 3-D OBJECT TO YIELD INDICATIONS OF THE OBJECT WALL DEFORMATIONS

The invention relates to a method for processing a sequence of images of a distortable 3-D object to yield indications of the object wall deformations during a given interval of time. In particular, the invention relates to a method for processing a sequence of 3-D ultrasound images of a body organ having a wall that moves either inwardly or outwardly in the time, to yield indications of said organ wall motions during contractions or relaxations and other possible motions registered within an interval of time in the image sequence.

The invention particularly finds an application in the field of the ultrasound medical apparatus or systems, for processing ultrasound 3-D image sequences produced by these apparatus or systems, in order to display information of the way the organ walls move over a time delay during which a sequence of 3-D ultrasound images is registered.

A technique of modelization of a 3-D object is already disclosed by H. Delingette in the publication entitled "Simplex Meshes: a General Representation for 3D shape Reconstruction" published in the "Proceedings of the International Conference on Computer Vision and Pattern Recognition (CVPR'94), Jun. 20-24, 1994, Seattle, USA". In this paper, a physically based approach for recovering three-dimensional objects is presented. This approach is based on the geometry of "Simplex Meshes". Elastic behavior of the meshes is modeled by local stabilizing functions controlling the mean curvature through the simplex angle extracted at each vertex (node of the mesh). Those functions are viewpoint-invariant, intrinsic and scale-sensitive. Unlike distortable surfaces defined on regular grids, Simplex Meshes are very adaptive structures. A refinement process for increasing the mesh resolution at highly curved or inaccurate parts is also disclosed. Operations for connecting Simplex Meshes in order to recover complex models may be performed using parts having simpler shapes.

A Simplex Mesh has constant vertex connectivity. For representing 3-D surfaces, 2-D Simplex Meshes, where each vertex is connected to three neighboring vertices, are used. The structure of a Simplex Mesh is dual to the structure of a triangulation as illustrated by the FIG. 1 of the cited publication. It can represent all types of rotatable surface. The contour on a Simplex Mesh is defined as a closed polygonal chain consisting in neighboring vertices on the Simplex Mesh. The contour is restricted to not intersect itself. Contours are distortable models and are handled in independently of the Simplex Mesh where they are embedded. Four independent transformations are defined for achieving the whole range of possible mesh transformations. They consist in inserting or in deleting edges in a face. The description of the Simplex Mesh also comprises the definition of a Simplex Angle that generalized the angle used in planar geometry; and the definition of metric parameters that describe how the vertex is located with respect to its three neighbors. The dynamic of each vertex is given by a Newtorian law of motion. The deformation implies a force that constrains the shape to be smooth and a force that constrains the mesh to be close to the 3-D data-Internal forces determine the response of a physically based model to external constraints. The internal forces are expressed so that they be intrinsic viewpoint invariant and scale dependant. Similar types of constraints hold for contours. Hence, the cited publication provides a simple model for representing a 3-D object of interest. It defines the forces to be applied in order to reshape and adjust the model onto the 3-D object of interest. The "Simplex Mesh technique" is a robust segmentation technique.

The invention relates to an image processing method for processing a sequence of images of a distortable 3-D Object, each image being registered at a corresponding image instant within the interval of time of the sequence. The inward motions of the 3-D Object boundary are called contractions and the outward motions are called relaxations. It is an object of the invention to propose such a processing method having steps to construct and display an image of said 3-D Object represented with regions, each region showing a quantified indication relating to its maximal contraction or relaxation within said interval of time.

Such an image processing method is claimed in claim 1.

The displayed image provides the advantage to yield an easy estimation of the propagation of the deformations over the 3-D Object boundary within the given interval of time. In the displayed image, each region may show a quantified indication of the phase of a predetermined periodic function representing the motion of the region, said phase indication corresponding to the image of the sequence in which the maximal contraction or relaxation of said region has been estimated. In the displayed image, each region may show a quantified indication corresponding to the delay necessary for said region to attain its maximal contraction or relaxation from a predetermined reference. In the displayed image, each region may show a quantified indication of the image instant when said region have had its maximal contraction or relaxation between the image corresponding to said image instant and an adjacent image in the sequence.

It is also an object of the invention to propose such an image processing method for processing a sequence of 3-D ultrasound images of a body organ having a wall with regions that move either inwardly or outwardly in the time, in order to construct and display a virtual image of the organ wall represented with regions, having such quantified indications. It is also an object of the invention to propose such an image processing method wherein the quantified indications are given in a coded manner, preferably in a color coded manner. It is particularly an object of the invention to apply this method to 3-D ultrasound imaging, in order to yield quantified information relating to the maximum deformation of regions of the heart, in a color coded form, for easily estimating the propagation of the deformation during contraction and relaxation of cavities of the heart, from a sequence of images registered during the interval of time of a cardiac cycle. So, the invention also relates to an ultrasound examination apparatus having image processing means and to a program product for carrying out the method.

The invention is described hereafter in detail in reference to the following diagrammatic drawings, wherein:

FIG. 2 illustrates the determination of the maximal "distance" for a given region of the object wall, which is found between two images during a given interval of time;

FIG. 4 is a reproduction in black and white of a color coded image of a virtual image of the heart displayed according to the invention corresponding to the heart motions during a cardiac cycle;

FIG. 5 shows a diagram of an apparatus for carrying out the method.

Figure 1A:
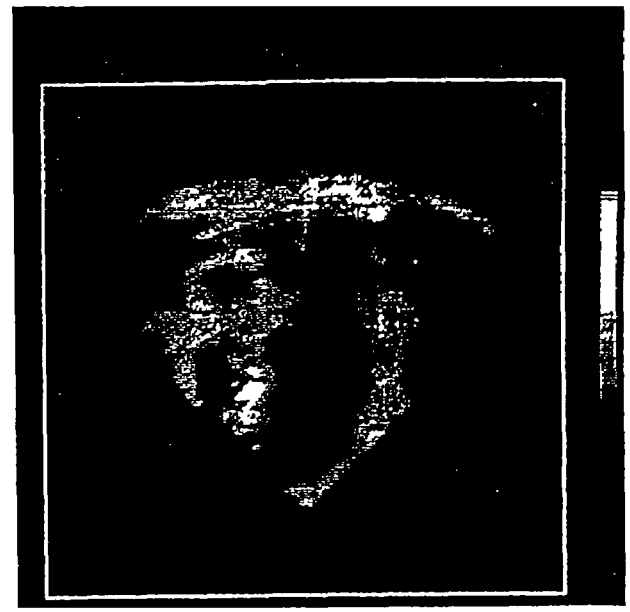
FIG. 1A shows an ultrasound 3-D image of the heart left ventricle as a distortable object.

The invention relates to an image processing method for analyzing the amplitude and direction of the displacements of wall regions of a distortable 3-D Object over a sequence of images, and for constructing and displaying a virtual image of said 3-D Object represented with the regions, each region showing a quantified indication relating to its maximal contraction or relaxation within the interval of time of the sequence of images. Said indications are preferably given in a coded manner, such as in a color-coded manner. The invention may be applied to a sequence of 3-D ultrasound images of a body organ having a wall with regions that move either inwardly or outwardly in the time, said organ having nearly periodic motions, in order to construct and display a virtual image of the organ wall represented with regions, having such quantified indications. The invention is particularly favorably applied to a sequence of 3-D ultrasound images representing the wall of a heart cavity having motions of contraction and/or relaxation during the interval of time of a cardiac cycle. Using 3D-ultrasound imaging, this method permits of analyzing the contraction and relaxation of the heart. This method yields quantified information relating to the maximum deformation of regions of a cavity of the heart, in a color coded form, for easily estimating the propagation of local deformation over the heart wall during contraction and relaxation of said cavity, from a sequence of images registered during the interval of time of the cardiac cycle.

The displayed virtual image provides the advantage to yield an easy estimation of the propagation of the deformations over a 3-D Object boundary within a given interval of time. In the displayed virtual image, each region may show a quantified indication of the phase of a predetermined periodic function representing the motion of the region, said phase indication corresponding to the image of the sequence in which the maximal contraction or relaxation of said region has been estimated within said interval of time. Alternately, in the displayed virtual image, each region may show a quantified indication corresponding to the delay necessary for said region to attain its maximal contraction or relaxation from a predetermined reference. In another embodiment, in the displayed virtual image, each region may show a quantified indication of the image instant within the sequence, when said region have had its maximal contraction or relaxation between the image corresponding to said image instant and an adjacent image of the sequence.

The quantitative estimation of local cardiac deformations, corresponding to contractions and relaxations of the heart wall regions represented in a 3-D image sequence, has important clinical implications for the assessment of the viability of cardiac muscle cells in said heart wall. The cardiac contractions and the cardiac relaxations are complex spatio-temporal phenomena, activated by the temporal changes of electrical potential in the cardiac muscular cells. During contraction, also occurs a twist motion of the heart wall. These considerations emphasize the complexity of the deformation, that may not be simply described as a temporal radial contraction or relaxation of the heart wall. Hence, a good spatial resolution is required when studying the contraction or the relaxation. Moreover, not only the amplitude of the contraction should be studied, but also the phase, which indicates locally the time when contraction or relaxation happens, and the way it is propagating. There are several cardio-pathologies due to conduction diseases: tachycardia and atrial or ventricular fibrillation are some examples. The analysis of the local cardiac contractions provides information about the condition of the heart and is useful for the study of such cardio-pathologies, as well as those inducing conduction abnormalities, such as the myocardial infarction for instance.

The method can be carried out using reconstructed or real-time 3D echocardiography, the images being formed using a trans-thoracic or a trans-esophageal probe. The method of the invention can also be applied to a sequence of 3-D images of other organs of the body that can be formed by ultrasound systems or ultrasound apparatus, or by other medical imaging systems known of those skilled in the art.

In the example described hereafter, analysis of the cardiac wall motion is performed from a sequence of 3-D simplified models of the left ventricular volume, which are obtained from the segmentation of 3-D ultrasound images of the heart. For the construction of the virtual image to be displayed and for the estimation of quantified indications relating to the contraction or relaxation of regions of the heart to be represented in said virtual image, the sequence of 3-D segmented images is further processed using one of two different techniques or both those techniques.

The first technique consists in a Fourier analysis of the motion over the models of the 3-D segmented sequence. A first model, called reference model of the left ventricle, is first chosen in an image called first image among the different successive images of the sequence of 3-D simplified models. The volume of the left ventricle varies from one image to the following image. So, the corresponding models vary from one image to the following image. This first technique comprises, for each region of the virtual image or model to be displayed, a definition of corresponding region on each model of the image sequence. Then, this first technique comprises a computation of the motion between the corresponding region defined on each model of the images of the sequence and the corresponding region on the reference model of the first image, based on the assumption that this motion is periodic. This first technique further comprises a definition of a periodic function of motion and a derivation of the phase associated to the motion from a Fourier analysis, for estimating a continuous information of phase from the set of images forming the sequence. The continuous information of phase indicates the delay for attaining the maximum of contraction or relaxation, for each region of the virtual model, from the reference model.

The second technique comprises a computation of the amplitude of motion between corresponding regions of two successive models, called couple of models, of two successive images of the sequence, instead of considering each model of the sequence with respect to a reference model. To each couple of model is associated an instant of time: for instance, the image instant when the last in time of the two images of the couple is registered in the interval of time of the sequence. In this second technique, the amplitude of motion called "distance" is estimated for the regions of each couple of models. The image instant within the interval of time of the sequence when this motion is maximal corresponds to a maximum of contraction or relaxation, between corresponding regions on the considered models of a couple.

These two techniques are complementary: the first one gives local quantified information of phase based on a global time-analysis of the motion throughout the sequence and on the assumption that the cardiac motion is periodic; and the second one gives local quantified information of the instant of time when a maximum of motion occurs between two models, so is based on an analysis of the motion that is more precise in the temporal dimension.

In order to represent the local quantified information of maximal contraction or relaxation in the sequence of images, a predefined color-map is used. Said color-map associates the instant of maximal contraction or relaxation related to each region as estimated according to the second technique, or the phase related to each region as estimated according to the first proposed technique, to a color, and then fits the color on the corresponding regions of a generic or mean model, called virtual model, of the left ventricle, thus yielding the information of the way the contraction or relaxation propagates in the myocardium. Furthermore, the path of propagation of the contraction or relaxation can be superimposed on this representation.

The present image processing method comprises steps of:

1) Acquisition of a Sequence of 3-D Images of a 3-D Object.

In an example, 3-D images of a heart cavity wall, for example the wall of the heart left ventricle, are acquired using an ultrasound examination apparatus. FIG. 1A represents one of such images. These images are assembled in a sequence of images. The sequence images can be acquired at a rate of 15 to 30 or 50 images per second, each image of the sequence being preferably associated to an instant of the cardiac cycle. Other examples of forming sequences of 3-D images of different organs, whose shape or dimensions vary over time, may be found by operators of ultrasound apparatus or of other systems of image acquisition.

2) Segmentation of the 3-D Images of the Sequence.

Figure 1B:
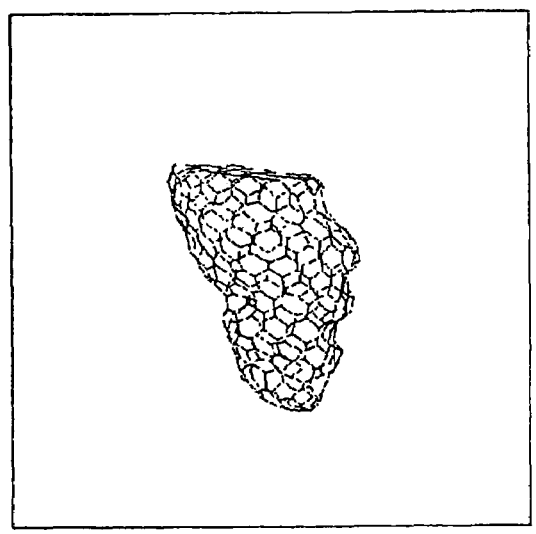
FIG. 1B shows a 3-D Simplex Mesh Model for segmenting this object.

After the acquisition of the image sequence, the images are segmented. Any method of segmentation, which is able to segment the 3-D object in the images of the sequence, may be used. The result of the segmentation operation permits of locating the voxels of the wall of the 3-D Object, for instance the internal wall of the left ventricle. Referring to FIG. 1B, preferably, the segmentation technique of "Simplex Mesh" is used because it is robust and gives excellent results. This Simplex Mesh Technique has been previously described in relation to the publication above cited as the state of the art. A "Simplex Mesh model" that is used is illustrated by FIG. 1B. The segmentation step consists in mapping the Simplex Mesh Model onto the 3-D object of FIG. 1A. In the case of a heart cavity, an elementary 3-D Mesh Model, which may be for example a sphere, is set inside the 3-D cavity, then it is deformed and reshaped using the above-described internal and external forces, until it is mapped unto the internal wall of the cavity. This operation is performed for each image of the sequence, so that a sequence of images representing segmented 3-D objects is formed. In each of these images, the wall of the object of interest is represented by a Simplex Mesh Model with faces and edges. The faces are generally not planar. It is to be noted that in the process of segmentation, the segmented 3-D Object is represented by the faces and edges of the Mesh Model. The faces define regions of the 3-D Object. For refining the mapping of the Mesh Model onto the 3-D Object, the faces may be divided. So, the number of faces may differ from a model in a given image to the model in another image of the sequence. In order to avoid difficulties due to a varying number of faces of the models representing the segmented 3-D Object from one image to another, a unique number of faces corresponding to a given level of segmentation is preferably chosen for all the models of the images of the sequence, thus defining the number of regions to be considered.

These segmented images may be processed in order to transform each model representing the 3-D segmented Object into a binary model. For instance, the voxels inside the model are attributed the value 1, the voxels outside the model are attributed the value 0. The boundary of the 3-D binary model is located between the 0 and 1 regions and represents the location of the organ wall. Other possibility for attributing a boundary to a binary object may be used as known of those skilled in the art. The formation of a sequence of binary models is optional, but permits of minimizing the amount of calculation in the further steps of the image processing method.

In the segmented images, the 3-D Object that has been segmented using the Simplex Mesh Model, has faces denoted by Z having a center of gravity denoted by ZC. The point ZC may alternately be a reference point of a region of the simplified model.

3). Analysis of the Wall Movements for Estimating Quantified Indications Relating to Maximal Contraction Or Relaxation of the Regions.

The local analysis of the heart wall motions during contraction and relaxation is performed using the above cited two different complementary techniques.

3.1). Using Fourier Analysis of the Wall Motions

Figure 3A:
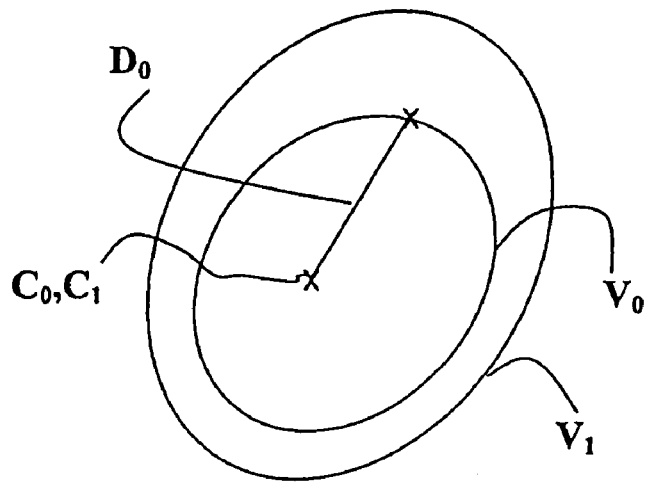
FIGS. 3A, 3B and 3C illustrate the determination of the "distance" for a given region of the object wall at different instants of a sequence of images.
Figure 3B:
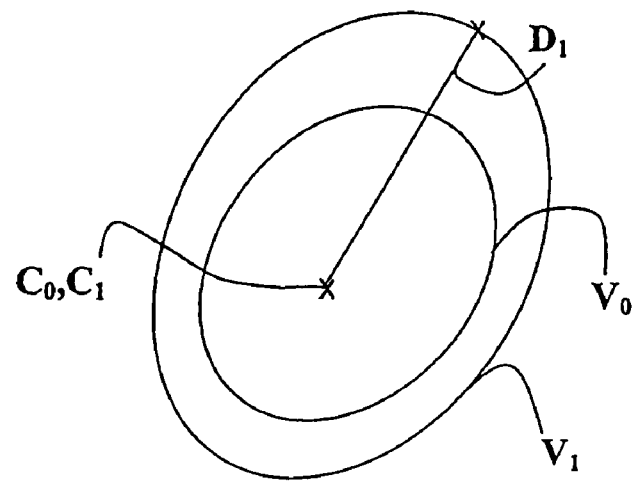
Figure 3C:
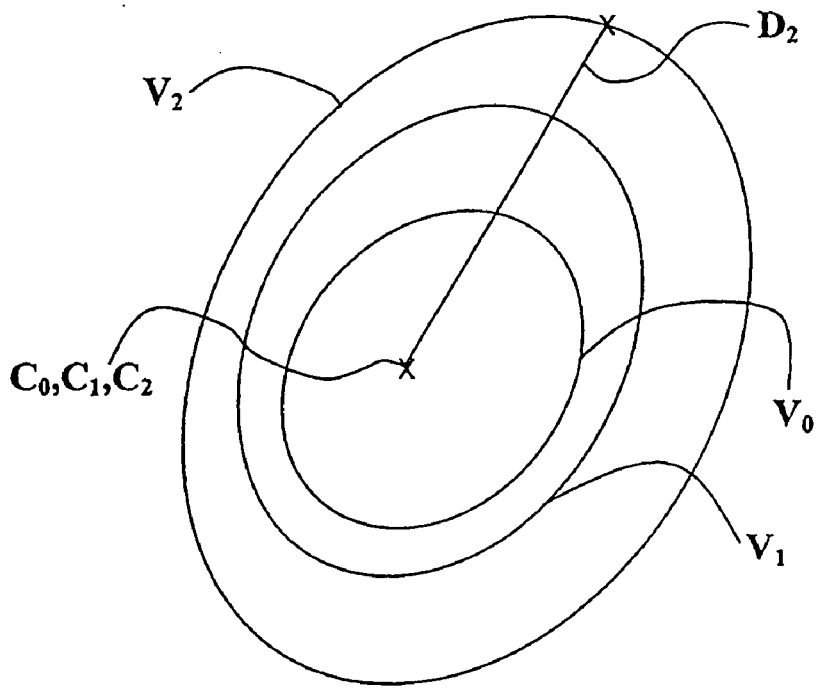

The walls of the segmented (or binary) 3-D Objects in the images of the sequence define different "volumes" of the models at different registered instants. The volume of the models varies periodically for physiological reasons. In the present example, the volume of the left ventricle varies periodically in function of the pulse during the cardiac cycle. Referring to FIGS. 3A, 3B, 3C, in the first technique implying a Fourier analysis, a method is proposed for the determination of a "distance" between the walls of the models considered in the sequence of segmented (or binary) images. This information of distance is defined in order to permit of estimating the amplitudes of movement of each face or region of the model in function of time. Some faces may show great amplitudes of movement during the cardiac cycle; some other faces may show very small amplitudes of movement during said cardiac cycle; some may have regular amplitudes of movement over several cardiac cycles; other faces may have irregular amplitudes of movement over several cardiac cycles. The centers of gravity $C_0$, $C_1$, $C_2$, ... $C_N$, of the models in the segmented images of the sequence are also considered. Referring to FIG. 3A, in an example, the centers of gravity $C_0$, $C_1$ of the models in the first and second segmented images may be found to be located in coincidence or not. If they are not located in coincidence, an operation of translation may be performed to superimpose those points $C_0$, $C_1$. In this first technique, the 3-D object of interest, for example the heart left ventricle, is first considered in one segmented (or binary) image of the sequence called first segmented image. Once the first segmented image is chosen, the other segmented (or binary) images of the sequence where the left ventricle varies in shape and dimension during the cardiac cycle are further considered one by one. Referring to FIG. 3A, the wall of the first segmented (or binary) 3-D Object defines a first cavity volume called first "volume" $V_0$ of the model at a first instant. Referring to FIG. 3B, the wall of the second segmented (or binary) 3-D Object defines a second cavity volume called "volume" $V_1$ of the model at a second instant. In this first technique, two processes are proposed, as examples, for obtaining the information of motion, during the cardiac cycle, of the regions that have been defined and delineated on the virtual image.

In a first process, corresponding regions are selected on the different models, these regions also corresponding to the regions of the virtual image. The "distance" is then defined as the computed distance between each region of the model and the common center. Referring to FIG. 3A, the "distance" from each region to the common center is first calculated for the first volume $V_0$. This distance is denoted by $D_0$. Then, referring to FIG. 3B, the "distance" from each face to the common center is calculated for the second volume $V_1$. This distance is denoted by $D_1$. Referring to FIG. 3C, the "distances" from each face to the common center are calculated for all the volumes of the sequence of segmented (or binary) 3-D Objects. A simple method to estimate the "distance" of a face or a region to the common center is to calculate the distance between the reference point of the face or region and the common center.

In a second process, the different models are all binary models. The centers of gravity of these models and of the virtual model may be superimposed forming a common center of gravity. Then, as illustrated by FIGS. 3A to 3C, for each region of the virtual image, the distances relating to the different binary models may be calculated along a line joining the center of gravity of the considered region on the virtual model to the center of gravity of said virtual model, which is the common center of gravity.

A function called function of motion is further estimated from these calculated distances. Assuming that the variation of said distances for the corresponding regions of the different volumes is periodic, the estimated function is a periodic function. For each face or region of a model, the phase of said function is derived from a Fourier analysis. Then a continuous information of phase is estimated over the corresponding faces or regions from the set of images forming the image sequence. This continuous information of phase permits of estimating the delay to attain the maximal contraction or relaxation for each face or for each region of the Models. The phase may be estimated in degrees or grades or radians. The delay may be estimated in unity of time or in function of the instant of image acquisition in the sequence. In this technique of phase calculation, the information of phase may thus be used to estimate the instant of the maximum of contraction or the maximum of relaxation of the heart left ventricle. This technique of Fourier analysis, based on a global time-analysis of the motion throughout the sequence, gives an information based on the assumption that the cardiac motion is periodic.

3.2). Using the Amplitude of Motion Between Two Successive Models

Referring to FIG. 2, once the points $C_0$, $C_1$ are superimposed, the displacement of the wall of the second model with respect to the first model, between the instants of the first and the second images, gives a "distance" denoted by $D'_1$ between the boundary of the first volume $V_0$ and the boundary of the second volume $V_1$ measured along a line issued from the common center of gravity $C_0$, $C_1$ of the first and second volumes $V_0$, $V_1$ and joining a reference point of a predefined region or face of the second volume. The displacement of the wall of the next volume $V_2$ with respect to the second volume $V_1$ gives the distance $D'_2$ between the boundary of said second volume $V_1$ and the boundary of the third volume $V_2$ measured along the same line issued from the common center of gravity $C_0$. In this technique, the different distances between the different models of the different segmented images are calculated. The models are considered by two, thus forming couples between the corresponding faces or regions of which the "distances" are calculated. The information of the distance between two successive volumes is used for computing the amplitude of motion between these two volumes. The instant of the image sequence when this amplitude of motion corresponds to a maximum $D'_{MAX}$ or to a minimum of volume corresponds to a maximum of contraction or of relaxation. This technique permits of analyzing the motion more precisely in the temporal dimension.

An interesting feature is to use this information of amplitudes for determining the smallest "volume" or the greatest "volume" of this heart ventricle and the corresponding instant of the cardiac cycle.

4). Constructing an Image of a Virtual Segmented Object

An image of the virtual model is constructed having a given number of faces or regions, which may correspond to the faces or regions of the successive models of the sequence, providing a predetermined level of segmentation of the models as above described.

5) Associating Given Colors to the Quantified Indications Relating to Maximal Motion.

Referring to FIG. 4, in this step, a Table of Colors associates a color to the quantified indications calculated from the sequence of successive simplified models. Using this color-coding operation, different colors may be associated to the different image instants of the sequence registered during a cardiac cycle (in unity of time or in time divisions of the cardiac cycle); or the values of phase (in degree, grade or radian); or the delays of time (in unity of time or in time divisions of the cardiac cycle). Numerous other color-coding techniques may be used by those skilled in the art for performing this step. FIG. 4 represent the color-coded object in shades of coded gray scale.

6) Displaying an Image of a Color-Coded Virtual Model

Using the color-coded Map defined by the color-coding operation, the appropriate colors, corresponding to the quantified indications of the maximum of contraction or relaxation, are fitted to the faces or regions of the virtual model, in order that each region or face be represented with a quantified indication as above calculated either with the first or the second technique. These indications may be the instant when a face or region has had its maximum of contraction or relaxation as measured in the second technique; or the phase value corresponding to its maximum of contraction or relaxation as measured in the first proposed technique; or the delay to attain its maximum of contraction or relaxation as measured in the first proposed technique.

This operation of coloring the faces or regions in function of the color-coded Map yields the information of the way the contraction or relaxation propagates in the myocardium. Furthermore, the path of propagation of the contraction or relaxation can be superimposed on this representation. Referring to FIG. 4, this operation provides a virtual color-coded image. Each face or each zone Z of the model representing the object of interest is attributed a color specific of the quantified indications. The color-coded virtual image is displayed for example on a screen. It may be registered or memorized. Preferably, a scale of colors representing the used quantified indication, such as instant of time, phase, delay, is displayed together with the virtual model. This permits a doctor of estimating the propagation of movement over the cardiac wall during a cardiac cycle. In the example of the left ventricle representation, it is favorable to display a curve of the cardiac pulse variation during cardiac cycles.

This method can be applied without difficulty to 2-D images, which are for instance cross-sections of the 3-D images of a 3-D object. In the case of the simplex mesh segmentation method, the 2-D segmented objects of the sequence are polygons having edges that are colored in function of their distances to the boundary of a 2-D object of reference. For a 3-D sequence of images, one might provide three orthogonal cross-section image sequences. When other segmentation methods are used, the 2-D images represent the trace of the wall of the segmented 3-D object. In these 2-D images, the wall has colored pixels or colored parts whose colors are function of their measured distances with respect to the boundary of the object of reference. The 3D or the 2D methods may be applied to ultrasound images as well as to X-ray images or to any other kind of image sequences.

Referring to FIG. 5, a medical examination apparatus 150 comprises means for acquiring a digital image sequence, and a digital processing system 120 for processing these data according to the processing method above-described. The examination apparatus comprises means for providing image data to the processing system 120 which has at least one output 106 to provide image data to display and/or storage means 130, 140. The display and storage means may respectively be the screen 140 and the memory 130 of a workstation 110. Said storage means may be alternately external storage means. This image processing system 120 may be a suitably programmed computer of the workstation 110, or a special purpose processor having circuit means such as LUTs, Memories, Filters, Logic Operators, that are arranged to perform the functions of the method steps according to the invention. The workstation 110 may also comprise a keyboard 131 and a mouse 132. This medical examination apparatus 150 may be a standard ultrasonic apparatus. The processing system 120 may use a computer program product having program instructions to be executed by the computing means of said processing system in order to carry out the above-described method.

The invention claimed is:

1. An image processing method for processing a sequence of images of a distortable 3-D Object, each image being registered at a corresponding image instant within the interval of time of the sequence having steps to construct and display a virtual image of said 3-D Object represented with regions, each region showing a quantified indication relating to its maximal contraction or relaxation within said interval of time, wherein the quantified indication is generated by processing the sequence of images of the distortable 3-D Object, and wherein the virtual image and the quantified indication are displayed together on a screen.

2. The image processing method of claim 1, wherein a quantified indication is the instant of the sequence when a region has had its maximum of contraction or relaxation between two successive images.

3. The image processing method of claim 2, wherein the amplitudes of motion between successive corresponding regions of the 3-D Object throughout the sequence of images are calculated as distances; and the maximal distance is detected for each set of successive regions; and the instant of the sequence when said maximal distance occurs is identified as the quantified indication of the instant of the sequence when a region has had its maximum of contraction or relaxation between two successive images.

4. The image processing method of claim 1, wherein a quantified indication is the phase value corresponding to the maximum of contraction or relaxation of a region.

5. The image processing method of claim 4, wherein the amplitudes of motion between the corresponding regions in the successive images and a common reference point predefined for all the images are calculated as distances; periodic functions of motion are estimated from these distances for the corresponding regions in the successive images; deriving phase values from Fourier analysis of said functions; identifying phase values of the periodic functions of motion as the quantified indication of phase relating to the maximum of contraction or relaxation for the corresponding regions of the 3-D Object in the images of the sequence.

6. The image processing method of claim 5, wherein the distances between a region and the common reference point comprises a computation of the distance between a reference point of the region and a common center of gravity of the 3-D object represented throughout the sequence.

7. The image processing method of claim 1, wherein a quantified indication is the delay for a region to attain its maximum of contraction or relaxation.

8. The image processing method of claim 5, wherein a quantified indication is the delay for a region to attain its maximum of contraction or relaxation; and
wherein for calculating said indication, a continuous information of phase is derived from each motion function and delay is estimated from said continuous information of phase.

9. The image processing method of claim 1, wherein each region of the constructed and displayed image is attributed a respective color of a color coded scale that is function of the calculated quantified indication relating to the maximum of contraction or relaxation of said region.

10. The image processing method of claim 1, comprising steps of acquiring image data of an image sequence, segmenting the 3-D object in the images of the sequence for locating the wall of the 3-D object, and coloring regions of the wall in function of the calculated quantified indications relating to the maximum of contraction or relaxation of said regions.

11. The image processing method of claim 10, wherein the segmented 3-D object in the sequence is processed for providing binary objects having a boundary representing the wall of the 3-D object of reference.

12. The image processing method of claim 10, wherein the 3-D object wall in the segmented images of the sequence are represented by a set of corresponding faces or regions.

13. The image processing method of claim 1, wherein 2-D images are formed representing cross-sections of the 3-D object in the sequence, and an image of the segmented 3-D Object is constructed and displayed having colored parts whose colors are function of the calculated quantified indication relating to the maximum of contraction or relaxation of said region.

14. The image processing method of claim 1, wherein the 3-D Object is the heart left ventricle.

15. The image processing method of claim 1, wherein the color-coded 3-D object is displayed in a 2-D or of 3-D image.

16. An ultrasound examination apparatus having means for carrying out an image processing method as claimed in one of claims 1-15, having means for processing a sequence of images of a distortable 3-D Object to construct and display an image of said 3-D Object represented with regions, each region showing a quantified indication relating to its maximal contraction or relaxation within the interval of time of the sequence.

17. A computer readable medium having processor-executable instructions thereon for a system comprising a suitably programmed computer or a special purpose processor having circuit means, which are arranged to process image data according to the method as claimed in claim 1.

18. A computer readable medium having processor-executable instructions thereon for an apparatus having means to acquire medical image data, having a system as claimed in claim 17 having access to said medical digital image data, and processing the image data, and having means to display the constructed virtual image.

19. A computer program product embedded in a computer readable medium comprising a set of instructions for carrying out a method as claimed in claim 1.

* * * * *